(12) United States Patent
Perkins

(10) Patent No.: US 8,080,909 B2
(45) Date of Patent: Dec. 20, 2011

(54) COOLING SYSTEM AND METHOD FOR AN ELECTRIC MOTOR

(75) Inventor: William Paul Perkins, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 209 days.

(21) Appl. No.: 12/468,157

(22) Filed: May 19, 2009

(65) Prior Publication Data

US 2010/0295391 A1 Nov. 25, 2010

(51) Int. Cl.
- *H02K 1/32* (2006.01)
- *H02K 3/24* (2006.01)
- *H02K 5/18* (2006.01)
- *H02K 5/20* (2006.01)
- *H02K 9/00* (2006.01)

(52) U.S. Cl. ............... 310/64; 310/52; 310/53; 310/54; 310/57; 310/59

(58) Field of Classification Search ............. 310/59, 310/64, 52–57; 165/164; 903/906; H02K 1/32, H02K 3/24, 5/18, 5/20, 9/00
See application file for complete search history.

(56) References Cited

U.S. PATENT DOCUMENTS

| | | | |
|---|---|---|---|
| 3,141,416 A * | 7/1964 | Bolan et al. ............... 417/423.5 |
| 4,766,557 A * | 8/1988 | Twerdochlib ............... 702/51 |
| 5,038,853 A * | 8/1991 | Callaway et al. ............. 165/46 |
| 5,448,118 A * | 9/1995 | Nakamura et al. ............ 310/54 |
| 5,531,285 A | 7/1996 | Green |
| 5,622,051 A | 4/1997 | Iida et al. |
| 5,744,880 A * | 4/1998 | Kudoh et al. ............... 310/58 |
| 5,839,327 A | 11/1998 | Gage |
| 5,955,805 A * | 9/1999 | Chaudoreille et al. ........ 310/90 |
| 6,202,428 B1 * | 3/2001 | Katayama et al. ............ 62/160 |
| 6,323,613 B1 | 11/2001 | Hara et al. |
| 6,386,279 B1 * | 5/2002 | Okabe et al. ............... 165/202 |
| 6,432,018 B1 | 8/2002 | Morse et al. |
| 6,599,104 B2 * | 7/2003 | Saito et al. ............... 417/366 |
| 6,674,189 B2 * | 1/2004 | Watanabe et al. ............ 310/52 |
| 6,700,236 B2 | 3/2004 | Umeda et al. |
| 6,779,622 B2 | 8/2004 | Mizorogi |
| 6,879,069 B1 * | 4/2005 | Weidman et al. ............ 310/61 |
| 6,992,409 B2 * | 1/2006 | Torii et al. ............... 310/52 |
| 6,997,284 B1 | 2/2006 | Nahrwold |
| 7,009,318 B2 * | 3/2006 | Iritani et al. .............. 310/58 |
| 7,083,014 B2 | 8/2006 | Forster |
| 7,122,928 B2 * | 10/2006 | Shindo .................... 310/89 |
| 7,188,699 B2 | 3/2007 | Moore et al. |
| 7,256,526 B1 | 8/2007 | Perkins et al. |
| 2002/0148600 A1 * | 10/2002 | Bosch et al. ............... 165/163 |

(Continued)

*Primary Examiner* — Quyen Leung
*Assistant Examiner* — John K Kim
(74) *Attorney, Agent, or Firm* — David B. Kelley; Brooks Kushman P.C.

(57) ABSTRACT

An electric motor which has a separate end cap heat exchanger, through which a liquid coolant is passed, is disclosed. In one example embodiment, the electric motor is a traction motor or motor-generator in a hybrid electric vehicle having an internal combustion engine. Additionally, in one embodiment, the heat exchanger has a low-temperature coolant loop configured to extract energy from the motor coolant. The electric motor may be installed in a variety of vehicles or other applications having greatly differing cooling requirements. By placing the heat exchanger and control componentry in the end cap, the cooling capability of the electric motor can be changed by selecting an end cap with the appropriate heat transfer characteristics and control componentry to provide the desired cooling. Consequently, a single electric motor, with a variety of end cap choices, can be used in a variety of applications.

13 Claims, 9 Drawing Sheets

U.S. PATENT DOCUMENTS

| | | |
|---|---|---|
| 2003/0173839 A1* | 9/2003 | Torii et al. .................. 310/52 |
| 2004/0021382 A1* | 2/2004 | Steinmeyer ............... 310/90.5 |
| 2004/0232795 A1* | 11/2004 | Tornquist et al. ........... 310/214 |
| 2005/0173973 A1 | 8/2005 | Moore et al. |
| 2005/0194847 A1* | 9/2005 | Gromoll et al. ............. 310/54 |
| 2005/0285458 A1* | 12/2005 | Moeleker et al. ............ 310/57 |
| 2006/0113851 A1* | 6/2006 | Ishihara et al. .............. 310/52 |
| 2008/0012437 A1* | 1/2008 | Kabata et al. ............... 310/54 |
| 2008/0024020 A1* | 1/2008 | Iund et al. .................. 310/61 |
| 2010/0295391 A1* | 11/2010 | Perkins ...................... 310/64 |

* cited by examiner

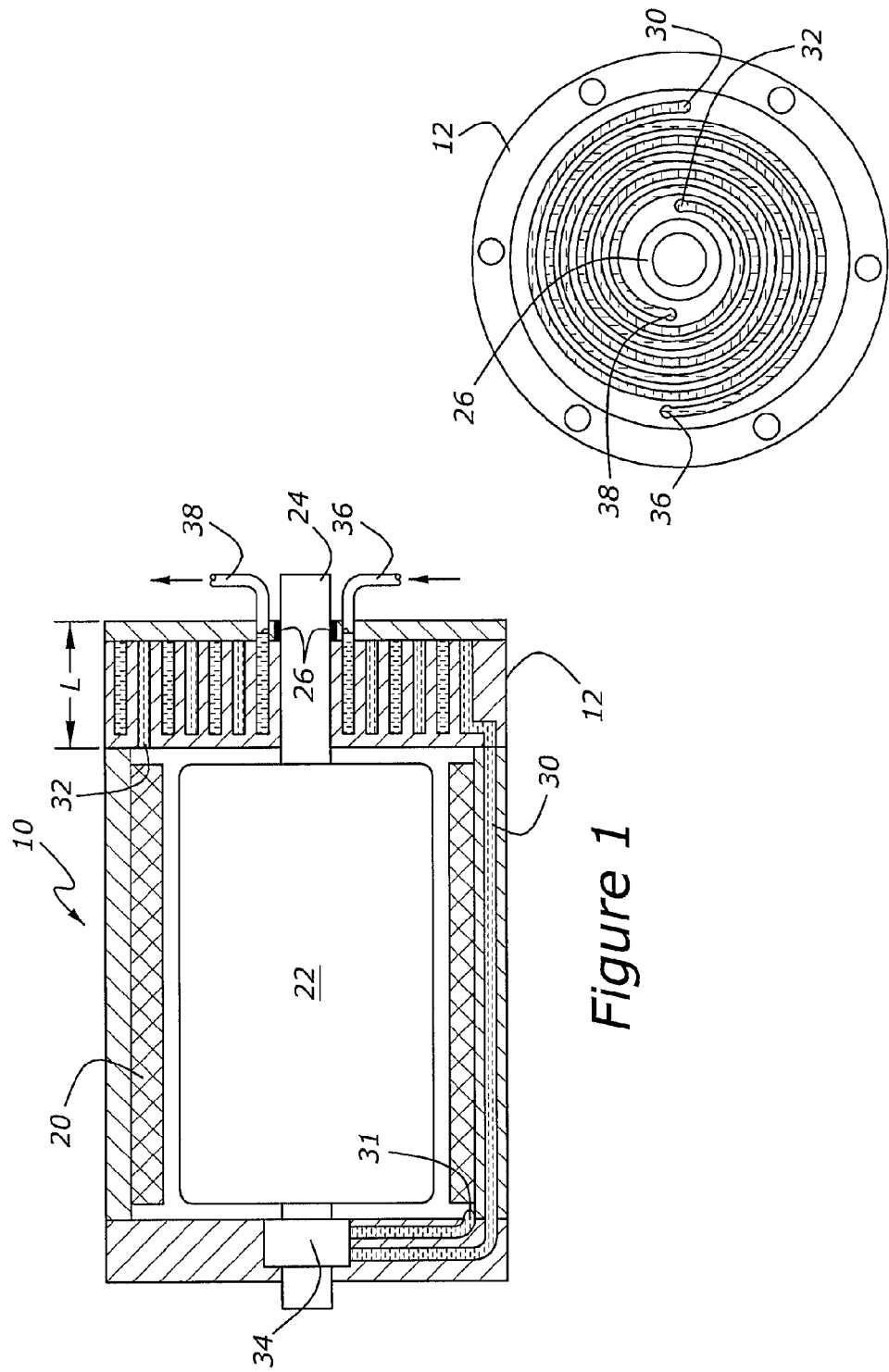

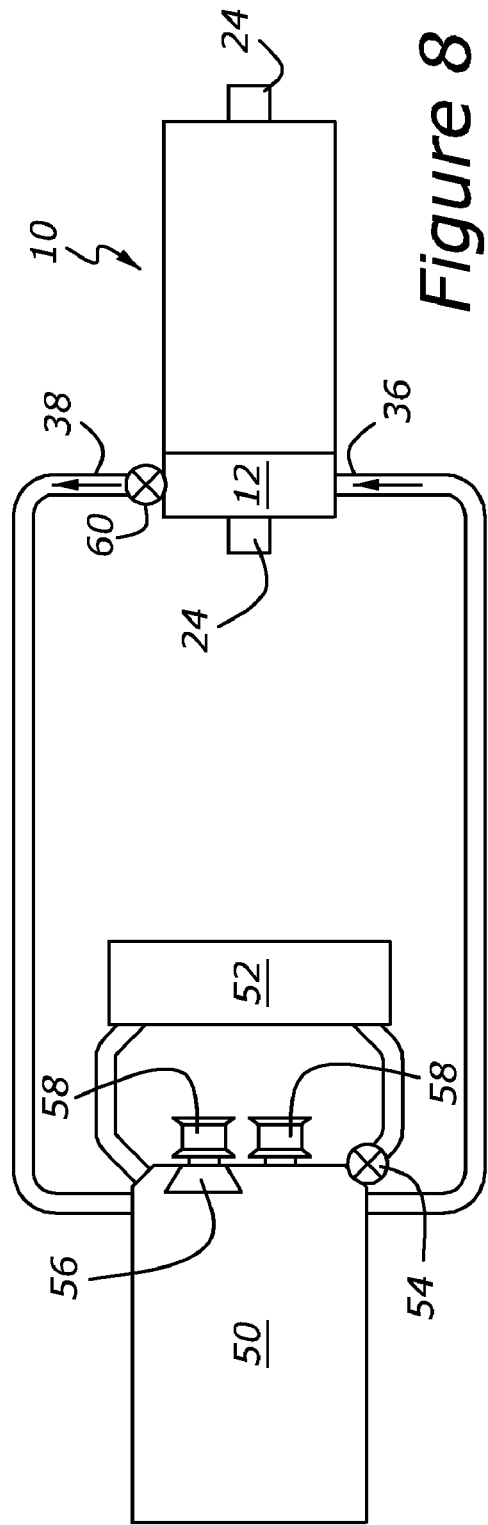
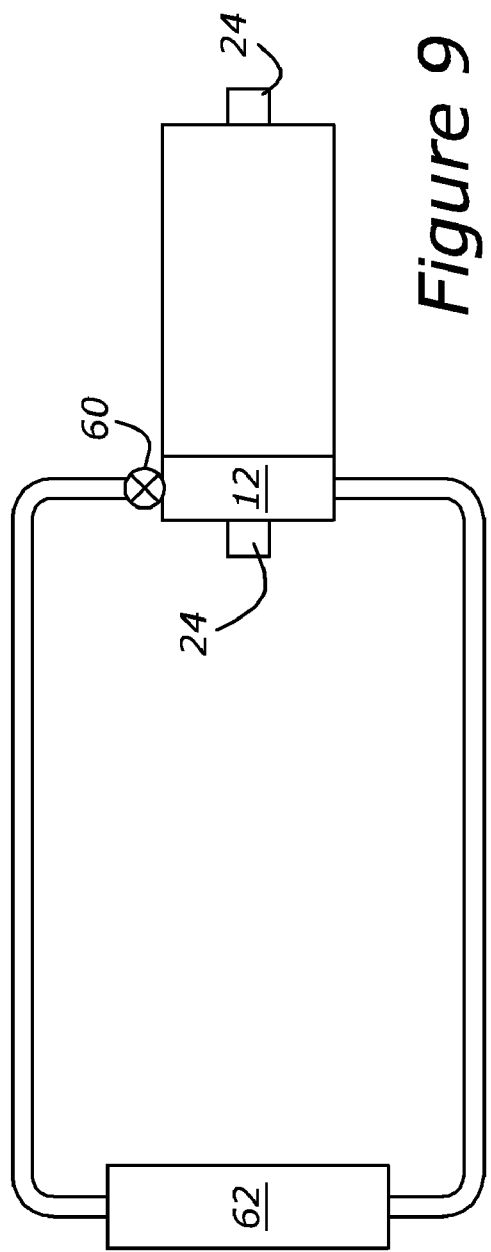

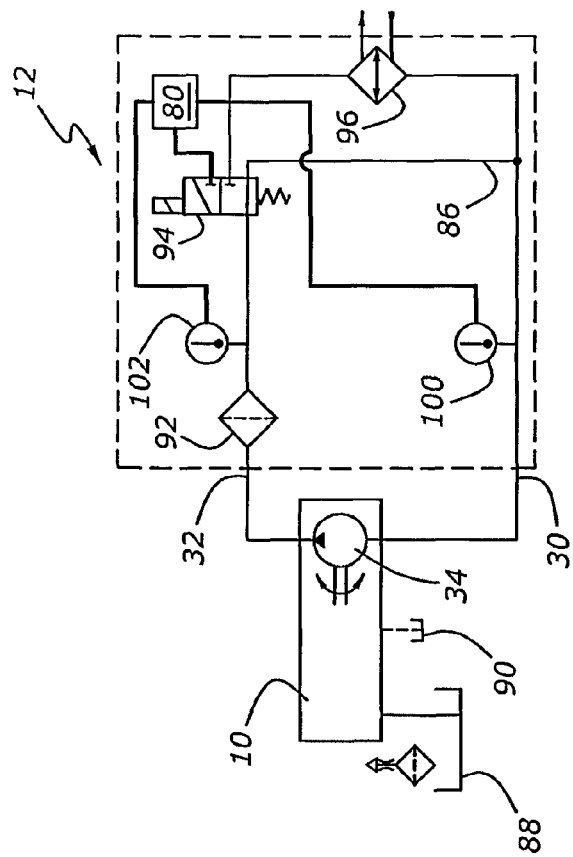
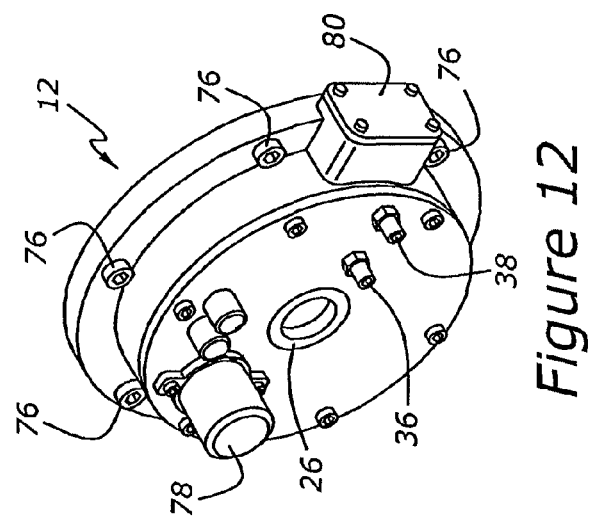
Figure 13
Figure 12

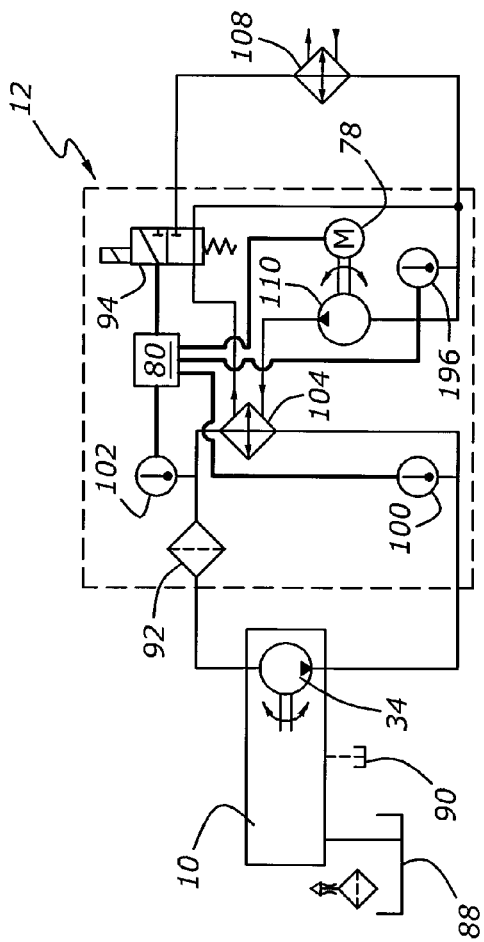
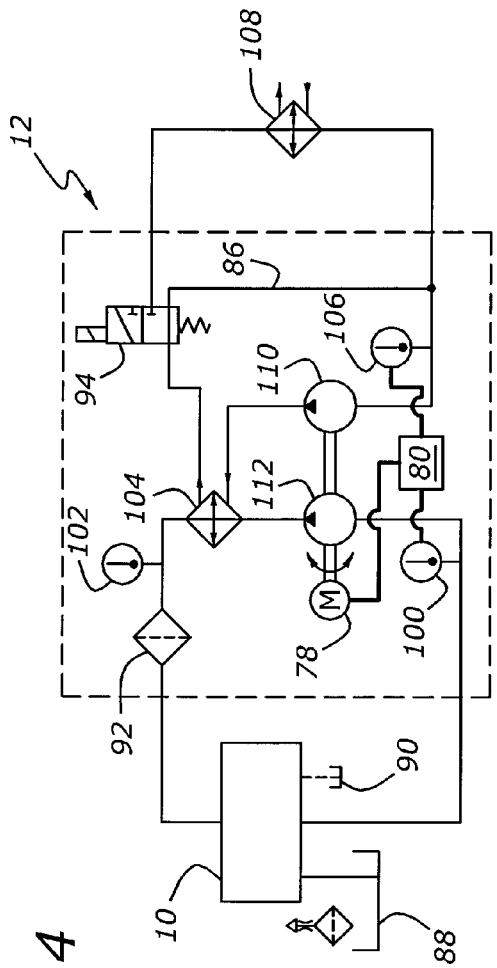

COOLING SYSTEM AND METHOD FOR AN ELECTRIC MOTOR

BACKGROUND

1. Technical Field

The development relates to providing cooling for electric motors.

2. Background Art

Electric motors can be used as a power source in vehicles. It is known that the motor can overheat depending on the severity of the operating condition to which it is subjected.

Most automotive vehicle manufacturers offer a variety of electric and hybrid electric vehicles for sale. The offerings differ in their weight, hauling capacity, and duty cycle. For vehicles that include an electric traction motor or a motor generator, or other high-power motor, the maximum power demands on the motor differ greatly depending on the application. The maximum power affects the cooling needs of the motor. Cooling, by circulating a liquid within an electric motor, is known in the prior art. However, cooling systems are designed for a particular motor used in a particular vehicle configuration with a particular cooling demand. For an alternate vehicle configuration that, for example, uses the same motor system but has a higher power level, greater cooling is needed. Such a system designed for a particular cooling demand must be redesigned for each cooling demand level to ensure proper heat transfer, volumetric coolant flow, and directional flow control, among other considerations.

SUMMARY

To overcome the difficulty of redesigning the entire motor system for each application, an electric motor is disclosed, which has an end cap attached to the motor, with the end cap having many of the components directed toward providing the desired cooling for the motor. For example, the end cap can contain: the heat exchanger having a high-temperature coolant passage, a low-temperature coolant passage, a pump to circulate the high-temperature coolant through the high-temperature coolant passage, and related components for hydraulic and thermal control, such as electronic valves, temperature and pressure sensors, and an electronic control unit. In one embodiment, a mechanical thermostatic valve is provided to control flow through the high temperature coolant loop. In another embodiment, an electrically-controlled valve is provided in the high temperature coolant loop, with the valve controlled by an electronic control unit (ECU). In one embodiment, the ECU is provided in the end cap with the ECU controlling the valve's position based on signals from temperature and/or pressure sensors electronically coupled to the ECU. In one embodiment, the motor's output shaft passes through the end cap. In this embodiment, the end cap contains a shaft seal and bearing. The end cap can also have a hydraulic accumulator, fill and drain ports, and fasteners, to attach the cap to the motor. Based on the intended application and the desired level of cooling, an end cap including: appropriate control components for the cooling system, bosses for the fluid and electrical inputs/outputs, etc., is attached to the motor. By including these components in the end cap, the motor can be standard for all applications with all necessary changes to accommodate the cooling and hydraulic rates required by various applications contained in the end cap.

According to an embodiment of the disclosure, an electric motor is disclosed which has a high-temperature coolant within. The motor has an end cap attached to the motor with an integral heat exchanger. The heat exchanger has a high-temperature coolant passage, a pump to circulate the high-temperature coolant through the high-temperature coolant passage, and related components for hydraulic and thermal control, for example, electronic valves, sensors, and electronic control unit. The end cap and the motor are separately assembled. In one embodiment, the high-temperature coolant is oil.

In a liquid-to-air heat exchanger embodiment, the exterior surface of the end cap has fins. In a liquid-to-liquid heat exchanger embodiment, the heat exchanger has a low-temperature coolant passage coupled to a low-temperature coolant loop external to the end cap. In one embodiment, the low-temperature coolant loop has a thermostat, which typically contains a thermally actuated valve. The high temperature and low-temperature coolant passages form interlaced spirals in the end cap, in one example.

In one example, there is a low-temperature coolant passage in the heat exchanger with the low-temperature coolant passage being part of a low-temperature coolant loop. Also, an external heat exchanger and a pump are disposed in the loop. The external heat exchanger transfers heat from the low-temperature coolant to another medium, such as air.

In another embodiment, the end cap of the electric motor contains hydraulic and thermal management components, including, for example, electronic valves, electronics control unit, a pump for the low-temperature coolant, electronic sensors, and a hydraulic accumulator. These components are used to modify cooling of the motor. For example, it may be desirable to partially close a valve in the high-temperature coolant passage to allow faster motor warm-up. By allowing faster warm-up, parasitic drag caused by the motor lubricant may be reduced.

In yet another embodiment, the electric motor is disposed in an automotive vehicle. There is a heat-generating unit separate from the electric motor already described. This heat-generating unit can be an internal combustion engine, a power-steering pump, or a transaxle. The heat-generating unit has a cooling loop adapted to circulate a liquid coolant, a pump in the heat-generating unit cooling loop, a heat exchanger in the heat-generating unit cooling loop; and a branch of the heat-generating unit cooling loop coupled to the motor's low-temperature coolant loop. The low-temperature coolant may be, for example, a water-based coolant, power steering fluid, hydraulic fluid, dielectric fluid transmission fluid or lubricating oil.

In one embodiment, the low temperature passage is coupled to a branch off of an air-conditioning loop coupled to an air-conditioning unit or any refrigeration unit. Refrigerant is the working fluid in this embodiment.

Also disclosed is a hybrid electric vehicle including an internal combustion engine with an internal cooling path, a cooling circuit coupled to the internal cooling path in the engine, an external heat exchanger, e.g. a radiator, disposed in the cooling circuit, and a water pump disposed in the cooling circuit. The vehicle also has an electric motor with a heat exchanger disposed in an end cap of the electric motor. The motor's heat exchanger includes a high-temperature cooling passage with the high-temperature passage's inlet connected to a circulating pump and the high-temperature passage's outlet coupled to the motor's interior. The heat exchanger in the motor's end cap also has a low-temperature cooling passage adapted to circulate a water-based coolant. The low-temperature cooling passage is coupled to the engine cooling circuit. The end cap may also contain thermal management components, for example, electronic valves and thermal sensors. The end cap assembly of the electric motor is a separate component from the electric motor. Non-limiting embodiments show the electric motor functioning as a motor-generator, a traction motor, or both.

Also disclosed is a method to provide a cooling system for an electric motor. An end cap with an integral heat exchanger is selected, which has predetermined heat transfer characteristics. The end cap with these characteristics is attached to the electric motor housing. The method also includes determining the cooling requirement of the electric motor at its most demanding operating condition for its design duty cycle. Based on that cooling requirement the predetermined heat transfer characteristics which provide the required cooling are computed. The heat exchanger in the end cap has a low-temperature coolant passage and a high-temperature coolant passage. The predetermined heat transfer characteristics take into account the following factors: material of the end cap, the effective surface area for heat transfer between the high-temperature and low-temperature coolants, the expected coolant flow rates, the expected temperatures, the properties of the low-temperature coolant, and the properties of the high-temperature coolant.

An advantage of the present disclosure is that having the heat exchanger and hydraulic components for cooling the motor placed in the end cap, the cooling level required for the motor's application can be met by selecting an end cap assembly with the desired cooling capacity, while little or no change is made to the motor itself. In this way, a single motor design can be used in many vehicle applications with various end caps that can be coupled to the motor to satisfy the cooling requirements of the particular vehicle configuration.

The coolant passages are described above as high-temperature and low-temperature. However, according to an embodiment of the present disclosure, the motor can be warmed when the coolant within the motor is at a lower temperature than the external coolant. In such a situation, energy is supplied to the motor, thereby providing yet another advantage by bringing the motor to its desired operating temperature more quickly. The passages can be referred to as first coolant passage and second coolant passage with the understanding that in some situations these are high-temperature coolant passage and low-temperature coolant passage, respectively, when the motor is being cooled and in other situations these are low-temperature coolant passage and high-temperature coolant passage, respectively, when the motor is being warmed up.

The above advantages and other advantages and features of the present disclosure will be apparent from the following detailed description when taken in connection with the accompanying drawings.

BRIEF DESCRIPTION OF THE DRAWINGS

FIG. 1 is a side view of a cross section of an electric motor;

FIG. 2 is an end view of the end cap shown in cross-section to show the internal cooling passages;

FIG. 8 is a diagrammatic view of the cooling system for an electric motor coupled to the cooling system of an internal combustion engine cooling system;

FIG. 9 is a diagrammatic view of the cooling system for an electric motor;

FIG. 12 is an isometric view of an end cap according to one embodiment of the disclosure;

FIGS. 13-15 are diagrammatic views of the motor assembly with end cap per three embodiments of the disclosure.

DETAILED DESCRIPTION

Figure 4:
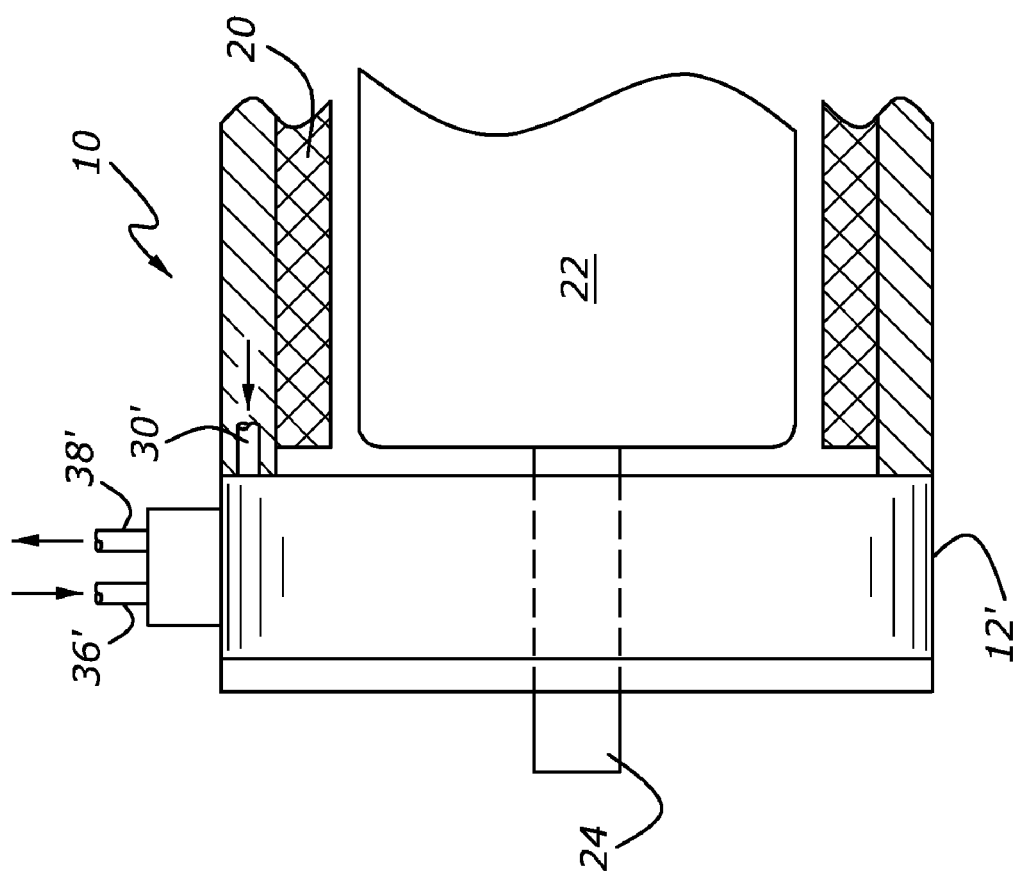
FIG. 4 is a side view of a cross section of a portion of the electric motor.

A motor 10 is shown in FIG. 1 which has an end cap 12. Motor 10 has a stator 20 with a rotor 22 inserted into stator 20. Output shaft 24 is connected to rotor 22. An end of output shaft 24 goes through end cap 12. Output shaft 24 can extend out at one end of motor 10 only or at both ends depending on the desired configuration. The end cap has a seal and bearing 26, which can be integrated or separate components. Motor 10 has a liquid coolant circulating within, contacting both the stator and rotor, or the stator only. In one embodiment, the liquid is oil. Thermal energy is extracted from motor 10 via coolant circulation. Coolant enters the end cap 12 at 30 and exits at 32, being pumped by pump 34 which is driven by shaft 24. Pump 34 has a coolant pickup 31 at the bottom of motor 10. Within end cap 12 is a liquid-to-liquid heat exchanger being supplied a second liquid coolant at 36 and removed at 38. The second liquid can be a water-based coolant, in one embodiment. In another alternative, pump 34 is located on the shaft at the other end of rotor 22 and is contained in the end cap assembly. In yet another alternative, pump 34 is an electric pump which is not coupled to shaft 24. In the configuration shown in FIG. 1, shaft 24 passes through end cap 12, with seal and bearing assembly 26 preventing fluid leakage out of motor 10 and supporting shaft 24.

In FIG. 2, an end view of end cap 12 is shown. The high temperature fluid, which circulates in the motor, is shown entering at 30 and exiting at 32. The low temperature fluid enters at 36 and exits at 38. The channels for the two fluids are concentric spirals. The effective heat transfer surface area of the channels depends on the length of the spirals in FIG. 2 and the cross-sectional shape of the channels, as seen from the side view in FIG. 1. By varying the length of end cap 12, dimension L of end cap 12 as shown in FIG. 1, the cooling capacity is affected.

Figure 3:
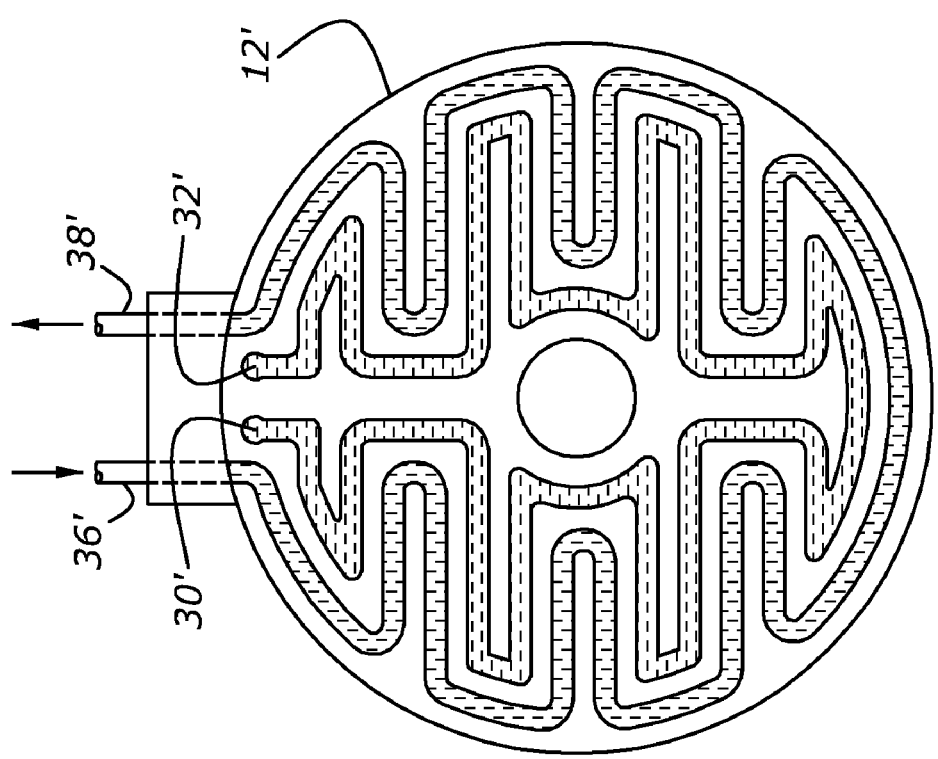
FIG. 3 is an end view of the end cap shown in cross-section to show the internal cooling passages.

An alternate embodiment of end cap 12' is shown in FIGS. 3 and 4 in which the low- and high-temperature fluids are conducted through channels which zig zag between each other. The flow shown in FIG. 3 has a parallel-flow configuration where both high- and low-temperature fluids enter at the same end (30' and 36') and travel parallel to each other, exiting at 32' and 38', respectively. Alternatively, a counter flow configuration is possible in which the exit of the low-temperature fluid is close to the entrance of the high-temperature fluid. Such a configuration would have the flow direction of either the low- or high-temperature fluid (not both) in FIG. 3 reversed.

Figure 6:
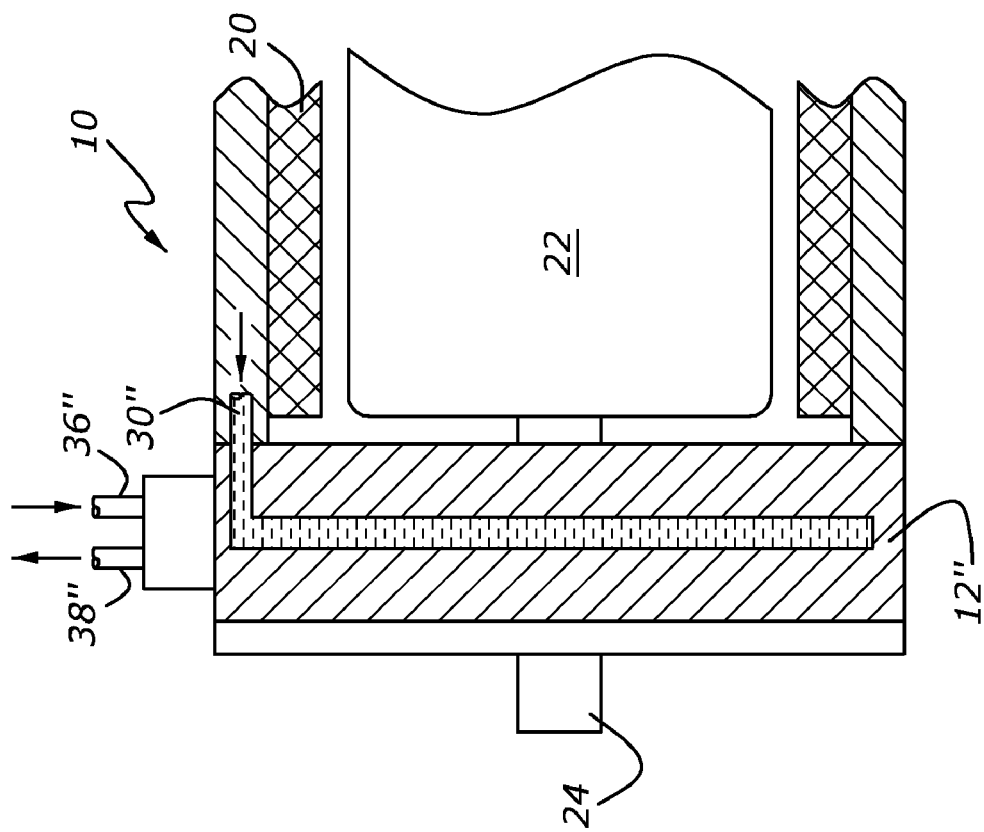
FIG. 6 is a side view of a cross section of a portion of the electric motor.
Figure 5:
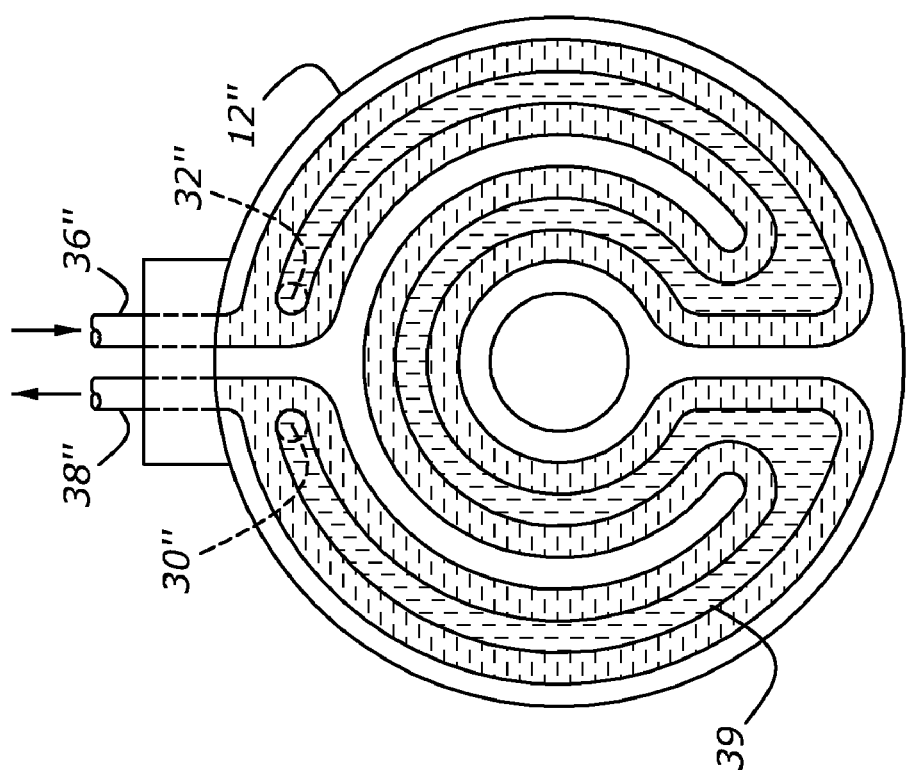
FIG. 5 is an end view of the end cap shown in cross-section to show the internal cooling passages.

Another alternative for end cap 12" is shown in FIGS. 5 and 6 in which low-temperature fluid enters into a cavity in end cap 12". A tube 39 for high-temperature fluid is placed through the center of the cavity such that the tube carrying the high-temperature fluid is surrounded by low-temperature fluid. A counter-flow configuration is shown in FIG. 5. However, both counter-flow and parallel-flow configuration embodiments are contemplated for any of the embodiments shown in FIGS. 2, 3, and 5. Tube 39 is shown as one continuous loop in the plane of the cross-section. However, it is desirable to affect the contact surface area between the low- and high-temperature fluids to allow a variety of cooling levels. Thus, tube 39 can be bent, multiply, in the direction along the length of end cap 12" to provide more cooling than a smooth bend as shown in FIG. 5. Alternatively, tube 39 can include multiple loops within the cavity formed in end cap 12". In FIG. 5, tube 39 contains the high-temperature fluid circulating within and low-temperature fluid is circulating in the cavity on the outside of tube 39. Alternatively, the cold fluid is circulated through tube 39 and the hot fluid is circulated within the cavity in end cap 12".

FIGS. 2, 3 and 5 show end cap 12, 12', and 12" having a liquid-to-liquid heat exchanger. An alternative is shown in FIG. 7 in which the outside surface of end cap 12''' is an air-to-liquid heat exchanger with rows of fins 40 placed on the outside of end cap 12'''.

An example configuration in which the low-temperature fluid is engine coolant is shown in FIG. 8. An internal combustion engine 50 has coolant that circulates through engine 50 and radiator 52 with a thermostat 54 regulating the flow. Engine 50 has a water pump 56 and pulleys 58. A branch off of the engine's cooling system is supplied to end cap 12 of motor 10. The branch supplying engine coolant to motor 10, in one embodiment, has a thermostatic valve 60 to control flow to end cap 12. As shown in FIG. 8, the thermostat 60 is external to end cap 12. Alternatively, thermostatic valve 60 and accompanying hydraulic control components are integrated with end cap 12.

In another example embodiment in FIG. 9, motor 10 has its own low-temperature coolant circulating system with its own pump (not shown) and external heat exchanger 62. In one embodiment, the low-temperature coolant pump is integrated with end cap 12. The low-temperature fluid is water-based in one embodiment or oil in another embodiment.

Figure 7:
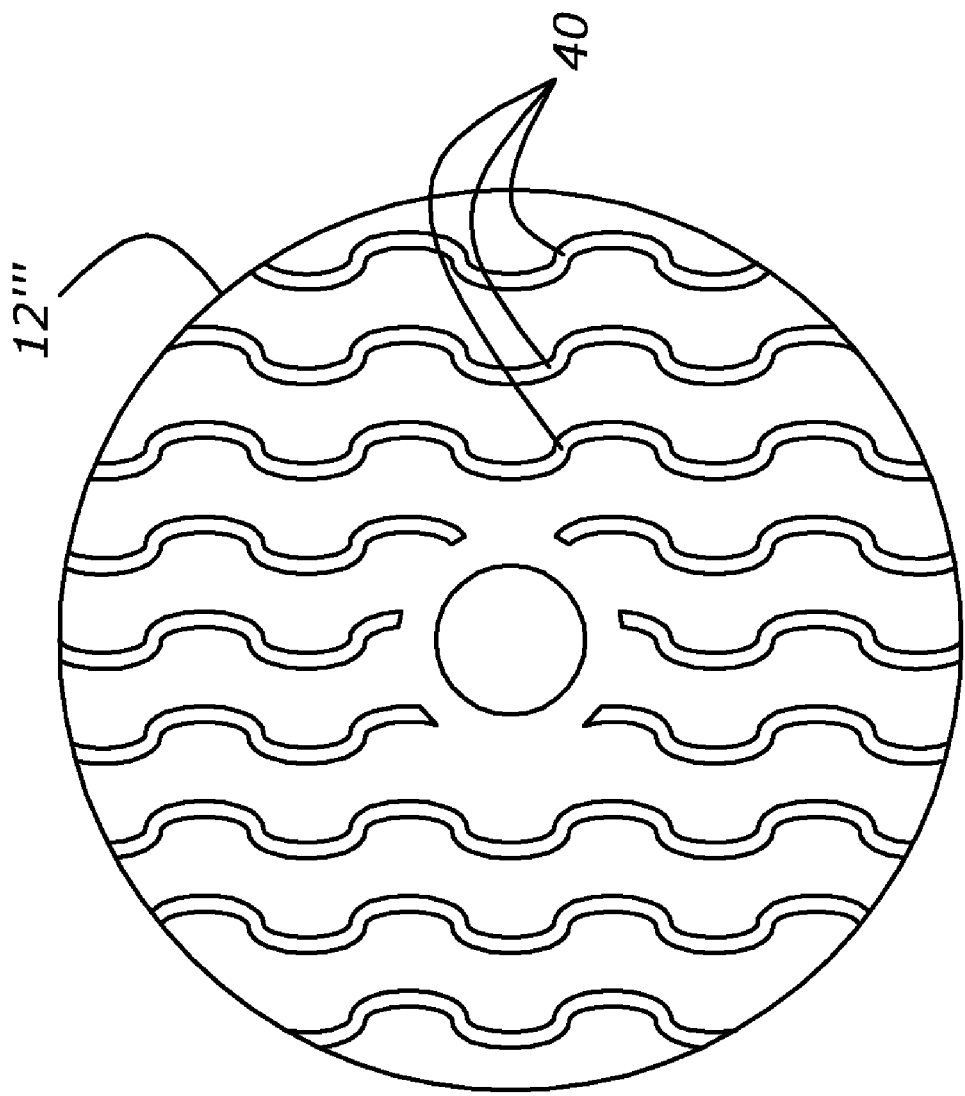
FIG. 7 is an exterior view of the end of the end cap with cooling fins on the exterior surface.

The embodiment of end cap 12 shown in FIG. 7 obviates the low-temperature-fluid cooling loop. A cooling fan (not shown) can be provided to force flow past fins 40. The cooling fan may be driven, for example, by motor 10 via shaft 24, by a separate electric motor (not shown), or by another source. In one embodiment, the cooling fan and drive are integrated with end cap 12.

Figure 10:
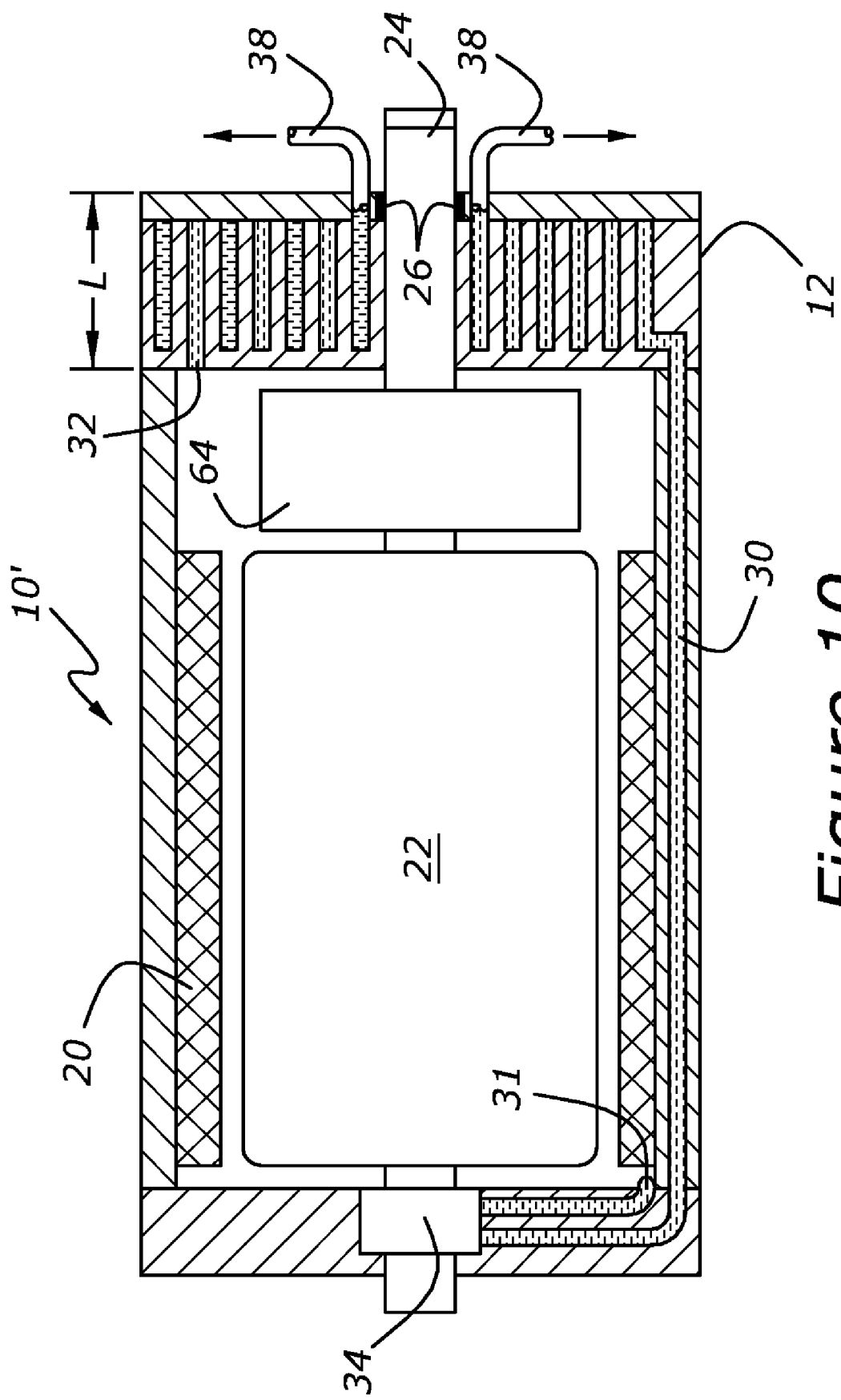
FIG. 10 is a side view of a cross section of a portion of the electric motor for an embodiment which includes a gear set within the housing of the electric motor.

Referring to FIG. 10, an electric motor 10' accommodates installation of an element within. The element can be gear set or any other element which augments motor functionality and would benefit from lubrication and cooling available within electric motor 10'.

Figure 11:
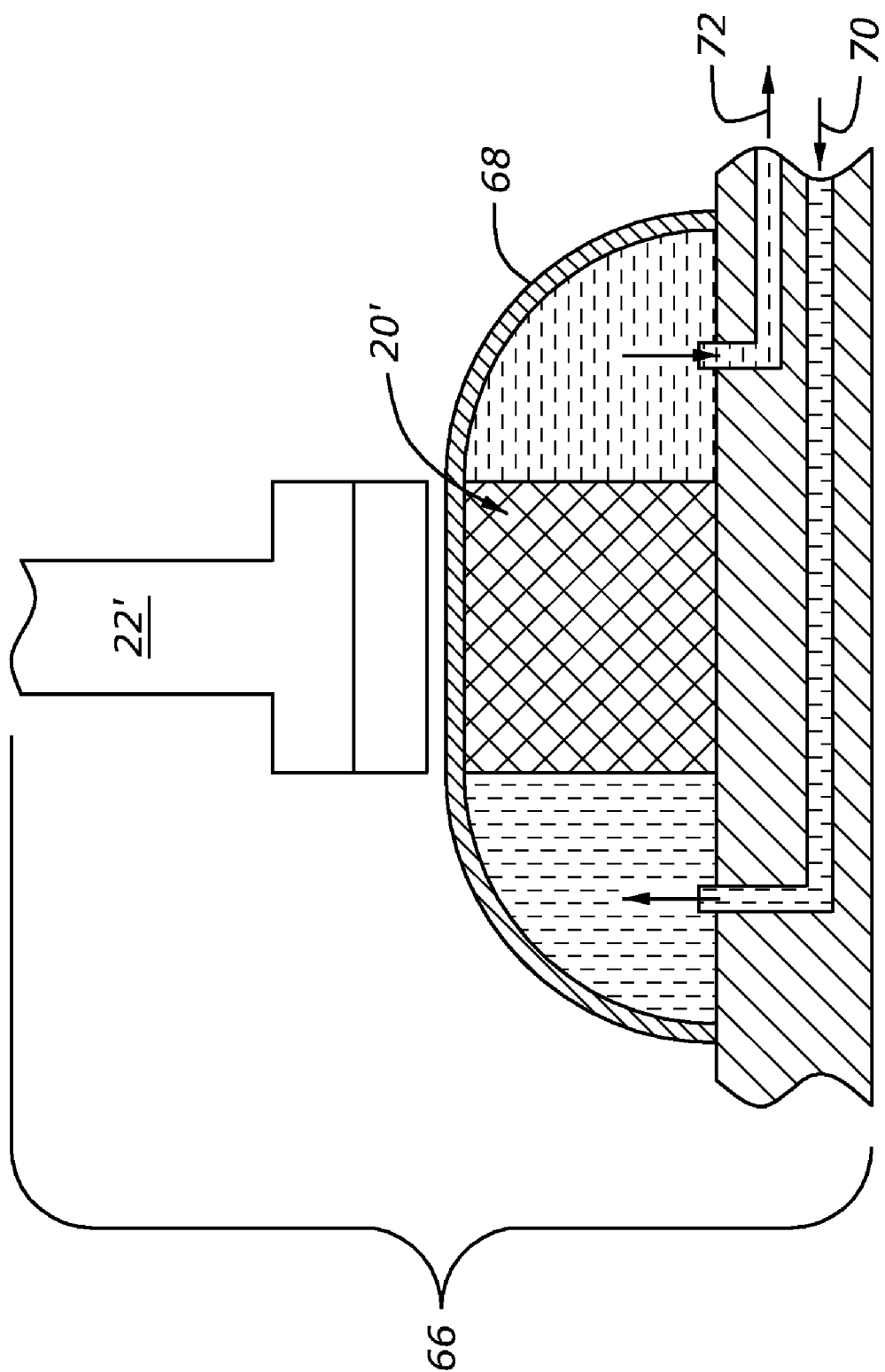
FIG. 11 is a side view of a portion of a dry electric motor in which the stator is cooled by a fluid circulating within an enclosure.

The embodiments shown in FIGS. 1 and 10 envision coolant sloshing and spraying about within motor 10. In these embodiments, the coolant may be a lubricating hydraulic oil that provides both lubrication and cooling to the rotor, stator, gear box (element 64 of FIG. 10), and any other components with motor 10. An alternative configuration is shown in FIG. 11 in which assembly 66 comprises rotor 22' and stator 20'. Stator 20' is provided lubricant within an enclosure 68. In FIG. 11, coolant is provided by inlet 70 and returned by outlet 72. In this embodiment, the motor is dry inside with coolant provided only to stator 20'.

An isometric drawing of an end cap, according to an embodiment of the present disclosure, in FIG. 12, shows inlet port 36 and outlet port 38 for low temperature coolant. Seal and bearing 26 are provided for sealing and supporting, respectively, a shaft (24 of FIG. 1). An electronic control unit (ECU) 80 is provided in end cap 12. In an embodiment in which the motor assembly is installed in a vehicle, an ECU mounted elsewhere in the vehicle can be used, in which case element 80 is a connector for the electrical connections between a remotely mounted ECU and electrical components within end cap 12. An electrically driven pump 78 is mounted on end cap 12. End cap 12 is coupled to motor 12 by fasteners 76. End cap 12 can be mounted to motor 12 by any known method.

A circuit diagram of end cap 12 is shown in FIG. 13. End cap 12 is coupled to electric motor 10. Electric motor 10, in one embodiment, is a traction motor coupled to an automobile axle. Electric motor 10, in some embodiments, has a vent 88 and a drain port 90. End cap 12 has a high temperature coolant loop, which supplies coolant to motor 10 at 32 with the return at 30. The coolant is circulated via pump 34 which is shaft driven by electric motor 10. In the coolant circuit is a filter 92, a temperature sensor 102, and a valve 94. ECU 80 is electronically coupled to valve 94 to control the fraction of coolant flow passing through air-to-liquid heat exchanger 96 and the fraction of flow bypassing heat exchanger 96 through bypass 86. Note that electrical lines are denoted by thicker lines than hydraulic lines in FIGS. 13-15. ECU 80 determines the position at which to control valve 94 based on temperature information from temperature sensors 100 and 102. Alternatively, valve 94 is a mechanical valve, such as a wax-motor driven thermostat, the position of which is based on the fluid temperature in communication with the wax motor.

An alternative embodiment is shown in FIG. 14, in which end cap 12 (indicated schematically by the box in dashed lines) has both a high-temperature and a low-temperature fluid circulating within. The high-temperature fluid coolant loop provides cooling for electric motor 10. Such circuit has an internal filter 92, temperature sensors 100 and 102 and an internal heat exchanger 104. Circulation of coolant through the high-temperature fluid loop is provided by pump 34 which is shaft driven by electric motor 10. Energy from the high-temperature fluid is extracted within heat exchanger 104 by virtue of a lower-temperature fluid circulating through the cold fluid loop. The amount of flow through the low-temperature fluid loop is determined by the position of valve 94 which controls the flow to: heat exchanger 108, bypass 86, or a combination of the two by pulse width modulation control of valve 94 or by valve 94 being controlled to an intermediate position. Flow through the low-temperature fluid loop is provided by a pump 110. Alternatively, if the low temperature fluid is part of another cooling system, such as an engine cooling system in an automotive vehicle, flow to through the low-temperature fluid loop may be provided by a pump provided for the other cooling system, which obviates pump 110. Valve 94 is electronically coupled to ECU 80. ECU 80 controls the position of valve 94, based on inputs received by ECU 80 from temperature sensors 100, 102, and 106, to maintain the desired level of cooling and/or component temperatures.

In yet another embodiment shown in FIG. 15, an electric pump 112 driven by electric motor 78 is provided to circulate coolant through the high-temperature fluid loop. Electric pump 112 is coupled to pump 110, which circulates fluid through the low-temperature fluid loop. Thus, electric motor 78 drives both pumps 110 and 112 in this embodiment. The rest of the circuit is similar to FIG. 14.

For the embodiments described to this point, the heat exchanger is used to transfer energy out of the motor assembly. Alternatively, the heat exchanger can be used to transfer energy into the motor assembly. This may be done to decrease parasitic drag losses when the motor and internal fluids are cold. This implementation is achievable with the same hardware, except that the external fluid is at a higher temperature than the motor coolant, allowing an energy transfer from the external fluid to the motor coolant to provide faster warm-up. The coolant loops are described below as first and second coolant loops and the coolant passageways are referred to as first and second coolant passageways. When the motor is being cooled, first coolant loop may be called high-temperature coolant loop and second coolant loop may be called low-temperature coolant loop. In the less common condition in which the motor is being warmed, first coolant loop may be called low-temperature coolant loop and second coolant loop may be called high-temperature coolant low. The same nomenclature applies to the coolant passageways and depends on whether the energy flow is into the motor for warming up or out of the motor for cooling down.

While particular embodiments of the disclosure have been shown and described, numerous variations and alternate embodiments will occur to those skilled in the art. All such variations and alternate embodiments and equivalents thereof are intended to be defined by the appended claims.

What is claimed:

1. An electric motor comprising:
an end cap attached to the motor;
an internal heat exchanger disposed in the end cap, the internal heat exchanger having a first coolant passage conducting a first coolant within the motor, and a second coolant passage conducting a second coolant flowing through a second coolant loop external to the motor;
a bypass passage disposed in the end cap parallel to the first coolant passage;
a valve coupled to the first coolant passage and the bypass passage;
a thermal sensor disposed in the first coolant loop; and
an electronic control unit coupled to the valve and the thermal sensor, the electronic control unit controlling a position of the valve based on a signal from the thermal sensor.

2. The motor of claim 1, further comprising:
a shaft fluid seal disposed in the end cap; and
an output shaft of the motor passing through the shaft fluid seal.

3. The motor of claim 1, further comprising: a pump circulating the first coolant through a first coolant loop contained within the motor.

4. The motor of claim 1, further comprising:
an external heat exchanger coupled to the second coolant loop; and
a pump disposed in the second coolant loop.

5. The motor of claim 1 wherein the end cap is nondestructibly removable from the motor.

6. The motor of claim 1, wherein the motor is one of a motor generator and a traction motor.

7. An electric motor comprising:
an end cap attached to the motor;
an internal heat exchanger disposed in the end cap, the internal heat exchanger having a first coolant passage conducting a first coolant within the motor, and a second coolant passage conducting a second coolant flowing through a second coolant loop external to the motor;
wherein the electric motor is disposed in an automotive vehicle, the vehicle comprising:
a heat-generating unit other than the motor;
a heat-generating unit cooling loop adapted to circulate the second coolant;
an external heat exchanger disposed in the heat-generating unit cooling loop; and
a branch off of the heat-generating unit cooling loop coupled to the second coolant passage.

8. The motor of claim 7 wherein the heat-generating unit is one of: an internal combustion engine, a power-steering pump, a power electronics unit, a gearbox, and a transmission.

9. The motor of claim 7 wherein the second coolant is one of: a water-based coolant, a dielectric fluid, oil, and a lubricant.

10. The motor of claim 1 wherein the electric motor is disposed in an automotive vehicle, the vehicle comprising:
a refrigeration unit adapted to circulate refrigerant through a refrigeration loop; and
a branch off of the refrigeration loop coupled to the second coolant passage.

11. An electric motor assembly disposed within an automotive vehicle, comprising:
a motor body having a stator and a rotor; and
an end cap removably attached to the motor body, said end cap including:
an internal heat exchanger comprising a first coolant passage carrying a first coolant, a second coolant passage carrying a second coolant, and a pump adapted to circulate the second coolant through the second coolant passage;
at least one temperature sensor disposed in the first coolant passage;
a valve disposed in the second coolant passage; and
an electronic control unit coupled to the at least one temperature sensor and the valve wherein the electronic control unit controls a position of the valve in response to a signal from the at least one temperature sensor.

12. The motor assembly of claim 11 wherein the vehicle is a hybrid electric vehicle and the motor is one of a motor generator and a traction motor.

13. The motor of claim 3, wherein the pump is powered by the motor.

* * * * *